2,898,206
HERBICIDE FOR DICHONDRA LAWNS

Charles A. Monoogian, Whittier, Calif., assignor to Benjamin Mooschekian, Samuel Mooschekian, Arnold Babajian, Ardy J. Babajian, Charles A. Monoogian, Frederick Nemoede, Rueben Mooschekian, Theodore Mooschekian, and Florence Greenback, trading as Downey Fertilizer Co., Downey, Calif.

No Drawing. Application June 13, 1958
Serial No. 741,745

5 Claims. (Cl. 71—2.6)

This invention relates generally to a method for killing certain weeds in Dichondra lawns, and more particularly to the use of monuron for that purpose.

The term "monuron" is the accepted name for 3-(p-chlorophenyl)-1,1-dimethylurea. That compound and thirty-five other species of trisubstituted urea compounds are referred to in U.S. Patent No. 2,655,445 as being illustrative of the herbicidally active compounds. In U.S. Patents Nos. 2,655,444, 2,655,446 and 2,655,447 a total of one hundred and seventy-seven distinct species of certain trisubstituted ureas are referred to as being illustrative of herbicidally active compounds. Said tri-substituted urea compounds are disclosed in said patents and particular species of the compounds mentioned in publications of the assignee of said patents as having a killing effect upon the roots of plants, and are taught as being especially useful for killing weeds. In the case of weed control on croplands and in orchards, it is taught in said patents and publications that the compounds be used in such amounts as will permit seepage of the compounds into the soil to a depth where they will contact the roots of weeds but not down far enough into the soil where they could cause appreciable damage to the roots of crops or trees.

I have now discovered that monuron may be used on Dichondra lawns to kill weeds without appreciably harming the Dichondra. More particularly, I have found that monuron is especially effective in killing annual blue grass (Oxalis corniculate) and certain weeds of the wood sorrel family, e.g. Oxalidaceae, such plant growth being species of the general class Oxalis, and yet when applied in the amounts hereinafter mentioned, it will not kill the Dichondra.

My invention provides for seepage of the herbicide into the soil past the roots of the Dichondra, which it does not kill, and down to a depth of the roots of the weeds. Dichondra is considered by many as being a weed, but in Southern California it is used extensively for lawn purposes. Dichondra is a small creeping plant and the roots thereof extend into the ground to a depth of only about one fourth of an inch below ground surface. The many flat and generally heart shaped leaves of the Dichondra plants in a lawn provide a flat expanse of solid green. Dichondra lawns need cutting most infrequently. Blades of grass and other weeds which may grow in a Dichondra lawn extend relatively high above the flat Dichondra lawn surface and thereby mar the beauty of the lawn.

For the purposes of this invention it is preferred that the compound, 3-(p-chlorophenyl)-1,1-dimethylurea, be in dust or powder form. It may be dispensed over the lawn as a dry powder, but it is preferred to mix the compound with water to form a suspension for spraying the compound over the lawn.

As taught in the aforementioned patents, the tri-substituted urea herbicides therein disclosed are preferably admixed with finely divided solids, e.g. talcs, clays, and flours, to improve the free-flowing characteristics of the composition. Also, inasmuch as the method of this invention is most advantageously practised by spraying the monuron upon the lawn in liquid composition form, surface-active dispersing agents of the types disclosed in said patents should be mixed into the monuron composition.

As to the amounts of the compound which should be used according to this invention, I have found that optimum results are had by spraying an aqueous suspension containing about one-half of a level teaspoon of a monuron composition (about 8.8 grams of the active compound) evenly over an area of one hundred square feet of Dichondra lawn. Such treatment will kill annual blue grass and other Oxalis in about a week to ten days' time and does not have any apparent effect upon the Dichondra. Satisfactory results are obtained by distributing from about 4.4 to about 17.6 grams of 3-(p-chlorophenyl)-1,1-dimethylurea evenly over an area of 100 square feet of Dichondra lawn.

The invention will be illustrated in greater detail by description in connection with the following specific examples of the practice of it.

Example 1

One level teaspoon (about 22 grams) of a powder composition containing 80% by weight of 3-(p-chlorophenyl)-1,1-dimethylurea, 18% by weight of powdered solid diluent, and 2% by weight of wetting and dispersing agents was mixed in about two gallons of water and sprayed evenly over a one hundred square foot area of Dichondra lawn having annual blue grass and other Oxalis weeds. Within two weeks time following treatment the blue grass and weeds were gone and some of the Dichondra leaves had turned yellow. During the next succeeding two week period the lawn gradually turned dark green again and there were no weeds present in it.

Example 2

The method and treatment of Example 1 was practised on another one hundred square foot area of Dichondra lawn, with the exception that one-half level teaspoon (about 11 grams) of the composition was used instead of a level teaspoon. Within two weeks time following treatment all weeds were gone and the Dichondra leaves remained unaffected.

Example 3

The method and treatment of Example 1 was practised on still another one hundred square foot area of Dichondra lawn, except that only one-fourth (about 5.5 grams) of a teaspoon of the composition was used. Most of the weeds were gone in about one month's time following treatment and the Dichondra remained unaffected.

Example 4

The method and treatment of Example 1 was practised on another one hundred square foot area of Dichondra lawn, except that one and one-fourth teaspoons of the composition were used. In about ten days time following treatment all of the weeds were gone but the Dichondra had turned yellow and became sparse.

Example 5

One-half level teaspoon of the dry composition of Example 1 was dusted as evenly as seemed possible over a one hundred square foot area of Dichondra lawn. After treatment some spots of the treated area became yellow and without weeds, on other spots the weeds continued to grow, and in still other spots the weeds were gone and the Dichondra remained unaffected.

It will be understood that it is intended to cover all changes and modifications of the examples of the invention herein chosen for the purpose of illustration which

What I claim is:

1. A method for killing plant growth of the Oxalis family in a Dichondra lawn which comprises evenly distributing 3-(p-chlorophenyl)-1,1-dimethylurea over the lawn in an amount of from about 4.4 grams to 17.6 grams of the compound per one hundred square foot area of the lawn.

2. The method of claim 1 in which said plant growth comprises annual blue grass and wood sorrel.

3. The method of claim 1 in which said compound is mixed with powdered solid diluent and wetting and dispersing agents.

4. The method of claim 3 in which the mixed composition is suspended in water and is sprayed upon the lawn.

5. The method of claim 1 in which the compound is used in an amount of about 8.8 grams.

References Cited in the file of this patent

UNITED STATES PATENTS

| | | |
|---|---|---|
| 2,655,445 | Todd | Oct. 13, 1953 |
| 2,655,447 | Todd | Oct. 13, 1953 |
| 2,847,293 | Harris et al. | Aug. 12, 1958 |

OTHER REFERENCES

Frear: "Chemistry of Pesticides," 3rd ed., publ. by Van Nostrand Co., New York, 1955, page 382.

Martin: "Guide to the Chemicals Used in Crop Protection," October 1957, 3rd ed., Canada, Dept. of Agric., pp. 212 and 213.

Metcalf: "Advances in Pest Control Research," publ. by Interscience Pub., New York, 1957, pages 61 to 63.

Akamine et al. in Chemical Abstracts, vol. 50, col. 8122(f) (Abstract of 1955 article).